United States Patent [19]

Ohnishi et al.

[11] Patent Number: 4,509,003
[45] Date of Patent: Apr. 2, 1985

[54] VECTOR CONTROL METHOD AND SYSTEM FOR AN INDUCTION MOTOR

[75] Inventors: Kouhei Ohnishi, Kodaira; Tadashi Ashikaga, Tokyo; Masayuki Terashima, Sakura, all of Japan

[73] Assignee: Kabushiki Kaisha Meidensha, Japan

[21] Appl. No.: 585,598

[22] Filed: Mar. 1, 1984

[30] Foreign Application Priority Data

Mar. 10, 1983 [JP] Japan .................................. 58-39433
Mar. 10, 1983 [JP] Japan .................................. 58-39434

[51] Int. Cl.$^3$ .............................................. H02P 5/40
[52] U.S. Cl. .................................. 318/800; 318/803; 318/808
[58] Field of Search ...................... 318/803, 807–811, 318/800, 722, 723

[56] References Cited

U.S. PATENT DOCUMENTS

| | | | |
|---|---|---|---|
| 3,775,649 | 11/1973 | Bayer et al. | 318/702 |
| 4,310,791 | 1/1982 | Akamatsu | 318/800 |
| 4,361,794 | 11/1982 | Kawada et al. | 318/800 |
| 4,450,395 | 5/1984 | Kawamura et al. | 318/723 |
| 4,456,868 | 6/1984 | Yamamura et al. | 318/800 |
| 4,460,860 | 7/1984 | Schwesig et al. | 318/802 |

OTHER PUBLICATIONS

Floter et al., "Field-Oriented Closed-Loop Control of an Induction Machine with the New Transvektor Control System", Siemens Review (1972), No. 6, pp. 248–251.

Primary Examiner—David Smith, Jr.
Attorney, Agent, or Firm—Lowe, King, Price & Becker

[57] ABSTRACT

In a vector control method and system for an induction motor, the decoupling calculation and 2-3 phase transformation are combined to simplify the system configuration, and the plus and minus signs of trigonometric signals are changed according to the rotational direction to enable four-quadrant operation. Further, in the case of a 3-phase induction motor driven by a PWM inverter, the number of the triangular (carrier) wave signals generated during one period of the power supply signal is increased with decreasing frequency of the supply voltage signal to improve the response characteristics when the motor is rotating at a low speed.

16 Claims, 14 Drawing Figures

FIG.6A
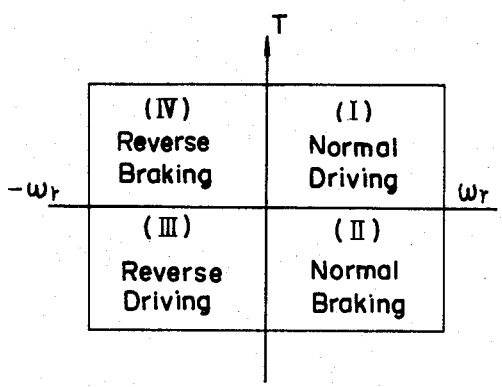
FIG.6B
|  | Torque (T) | Rotor Frequency ($\omega_r$) |
|---|---|---|
| (I) | + | + |
| (II) | − | + |
| (III) | − | − |
| (IV) | + | − |
FIG.6C
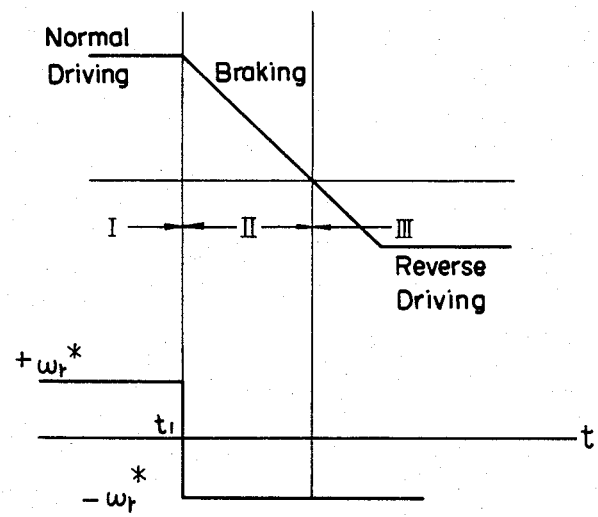

VECTOR CONTROL METHOD AND SYSTEM FOR AN INDUCTION MOTOR

BACKGROUND OF THE INVENTION

1. Field of the Invention

The present invention relates generally to a vector control method and system for an induction motor and more specifically to a decoupled-vector control method and system for an induction motor, in or by which the primary current corresponding to the secondary magnetic flux and the primary current corresponding to the secondary driving current are controlled independently in such a way that these two vectors meet at right angles to each other. Here, the above-mentioned decoupled-vector implies that the mutual interference produced between the secondary magnetic flux and secondary driving current is cancelled out.

2. Description of the Prior Art

Recently, the method of driving an induction motor has been highly developed owing to a remarkable progress in power electronic device technology. Especially, the vector control method has been proposed for driving an induction motor at variable speeds under quick response characteristics equivalent to a DC machine. In this vector control method, the primary current of an induction motor is divided into a primary exciting current to generate the secondary magnetic flux and a primary driving current to generate the secondary driving current, and further the vectors of the secondary magnetic flux and the secondary driving current are so controlled independently as to meet at right angles to each other. Further, in this vector control method, the magnitude of the secondary magnetic flux is controlled at a constant level and the secondary driving current is increased or decreased independently as in a DC motor. In the above-mentioned vector control method of driving an induction motor, however, since there exists a mutual interference between the secondary magnetic flux and the secondary driving current, the magnitude of the secondary flux is not maintained constant in practice. To overcome this problem, the so-called decoupled-vector control method is adopted, in which the mutual interference or the vector cross-term between the secondary magnetic flux and the secondary driving current is cancelled out. Theoretically there are three necessary and sufficient conditions in order to decouple two vectors of the secondary magnetic flux and the secondary driving current. These conditions are usually satisfied by adding a decoupling calculation unit to the ordinary vector control system.

In the above-mentioned decoupled-vector control method or system for an induction motor, however, since the decoupling calculation unit and the 2-3 phase transformation unit are provided independently, the system configuration is rather complicated.

Further, in order to drive an induction motor in exactly the same manner as in a DC motor, four-quadrant operation (to drive the motor in the normal or reverse direction freely) is indispensable. By the way, in the vector control method, since trigonometric function (SIN and COS wave signals) are used for transforming the 2-phase synchronously-rotating coordinate primary voltages into the 2-phase fixed coordinate primary voltage, it is important to change the plus and minus signs of these trigonometric signals continuously according to the rotational direction of an induction motor in order to achieve the above-mentioned four-quadrant operation.

Further, in practice, a pulse width modulation (PWM) type inverter is often used for driving a high torque 3-phase induction motor. In the PWM type inverter, a triangular wave signal is used as carrier for generating modulation signals with respect to the reference 3-phase primary voltage. However, in the conventional vector control method and system, the triangular wave signals must synchronize with the supply voltages and therefore the number of the triangular wave signals outputted during one period of the supply voltage decreases with decreasing frequency of the supply voltages. The results in problems in that higher harmonic current increases and the response characteristics deteriorate due to an increase in control delay or waste time caused by a long period of the triangular wave signal.

SUMMARY OF THE INVENTION

With these problems in mind, therefore, it is the primary object of the present invention to provide a vector control method and system for an induction motor in which the decoupling calculation unit and the 2-3 phase transformation unit are combined with each other into a simple system configuration.

It is another object of the present invention to provide a vector control method and system for an induction motor by which four-quadrant operation is possible by continuously changing the plus and minus signs of trigonometric signals according to the rotational direction of an induction motor.

It is a further object of the present invention to provide a vector control method and system for an induction motor provided with a PMW inverter by which the number of the triangular (carrier) wave signals generated during one period of the supply voltage signal is increased with decreasing frequency of the supply voltage signal in order to improve the response characteristics when the induction motor is rotating at a relatively low speed.

To achieve the above-mentioned first object, the vector control method and system for an induction motor according to the present invention comprises means for calculating fixed d-q coordinate primary voltages on the basis of the rotating $\alpha$-$\beta$ coordinate primary reference currents and the sine and cosine wave signals in accordance with calculating expressions.

To achieve the above-mentioned second object, the vector control method and system for an induction motor according to the present invention comprises step or means for detecting the rotational direction of the motor and outputting an up-or-down signal corresponding thereto to an up-down counter for generating a sine or cosine wave signal including the information of motor rotational direction.

To achieve the above-mentioned third object, the vector control method and system for an induction motor according to the present invention comprises steps or means for generating a voltage signal, the level of which is proportional to the magnitude of supply voltage frequency, for voltage-frequency conversion of the generated voltage signal, sequentially dividing the converted signal, outputting a plurality of switching signals according to the magnitude of supply voltage frequency and for selectively outputting the converted signal in response to the switching signals in such a way that less-times-divided signals are selected when the supply voltage frequency is low and many-times-divided signals are outputted when the supply voltage frequency is high.

BRIEF DESCRIPTION OF THE DRAWINGS

The features and advantages of the vector control method and system for an induction motor according to the present invention over the prior art vector control method and system will be more clearly appreciated from the following description taken in conjunction with the accompanying drawings in which like reference numerals designate corresponding elements or sections throughout the drawing thereof and in which:

FIG. 6A is a coordinate with rotor angular frequency as abscissa and with rotor torque as ordinate, for assistnce in explaining four quadrant operation of the second feature of the present invention;

FIG. 6B is a table showing signs of the rotor torque and the rotor angular frequency being classified into four quadrants;

FIG. 6C is a graphical representation showing an example of the four-quadrant operation, in which motor driving mode is shifted from the first quadrant operation through the second quadrant operation, to the third quadrant operation when the reference rotor angular frequency is switched from the normal direction to the reverse direction;

DETAILED DESCRIPTION OF THE PREFERRED EMBODIMENTS

Figure 1:
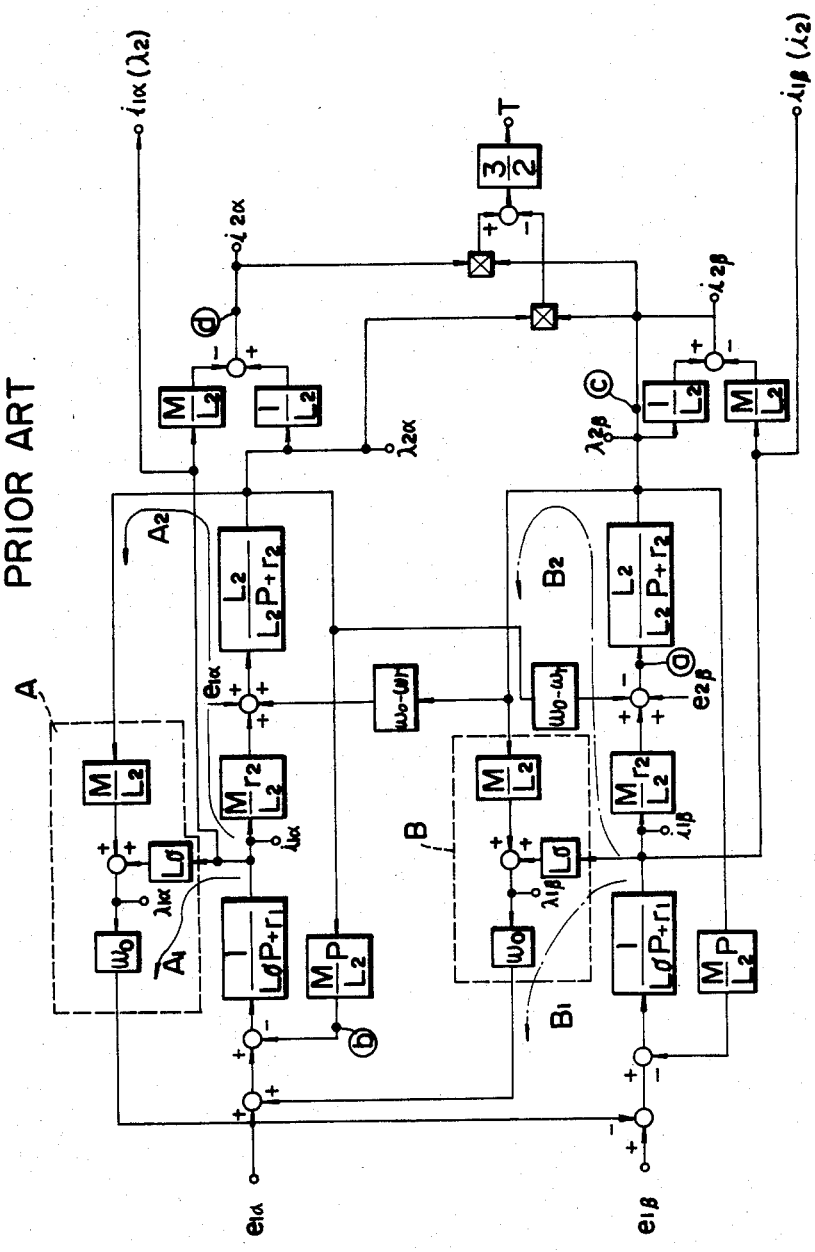
FIG. 1 is an equivalent schematic block diagram of a three-phase induction motor, in which three-phase electrical values are transformed into two-phase electrical values, the secondary electrical values are transformed into the primary electrical values, and the fixed coordinate is transformed onto a two-axis coordinate rotating in synchronization with the primary voltage, respectively.

To facilitate an understanding of the present invention, the principle of the decoupled-vector control method for an induction motor will be described hereinbelow. It is well known that an induction motor can be treated mathematically as a simplified model in dependence upon a two-axis theory. In this theory, all three-phase electrical values including those on the secondary side are transformed into two-phase electrical values on the primary side, on the assumption that higher harmonics, iron loss, magnetic saturation and so on are all ignored and signals are trigonometric functions.

In accordance with this two-axis theory, and primary-side voltage-current equation and the torque of a three-phase induction motor of the squirrel cage type can be represented on an $\alpha$-$\beta$ coordinate which rotates in synchronization with the primary voltage as follows:

$$\begin{vmatrix} e_{1\alpha} \\ e_{1\beta} \\ e_{2\alpha} \\ e_{2\beta} \end{vmatrix} = \begin{vmatrix} (r_1 + L_\sigma P) & -L_\sigma w_0 & \frac{M}{L_2} P & -\frac{M}{L_2} w_0 \\ L_\sigma w_0 & (r_1 + L_\sigma P) & \frac{M}{L_2} w_0 & \frac{M}{L_2} P \\ -\frac{Mr_2}{L_2} & 0 & \left(\frac{r_2}{L_2} + P\right) & -(w_0 - w_r) \\ 0 & -\frac{Mr_2}{L_2} & w_0 - w_r & \left(\frac{r_2}{L_2} + P\right) \end{vmatrix} \begin{vmatrix} i_{1\alpha} \\ i_{1\beta} \\ \lambda_{2\alpha} \\ \lambda_{2\beta} \end{vmatrix} \quad (1)$$

$$T = \frac{3}{2} (\lambda_{2\beta} i_{2\alpha} - \lambda_{2\alpha} i_{2\beta}) \quad (2)$$

where lower suffix $\alpha$ denotes the component on the $\alpha$ axis; lower suffix $\beta$ denotes the component on the $\beta$ axis; lower suffix 1 denotes the values on the primary side; lower suffix 2 denotes the values on the secondary side but transformed to the primary side, and further, e denotes the voltage; i denotes the current; $\lambda$ denotes the magnetic flux; r denotes the resistance; M denotes the mutual inductance; L denotes the inductance; $L_\sigma$ denotes the equivalent leakage inductance $L_\sigma = (L_1L_2 - M^2)/L_2$; P denotes the differential operator or Laplace operator: $P = d/dt$; $w_0$ denotes instantaneous angular velocity of the primary voltage vector or angular frequency of voltage-controlled power source; $w_r$ denotes the rotor angular frequency.

The above expression (1) indicates the relationship between the primary voltage and the primary current and the relationship between the secondary voltage and the secondary magnetic flux, while including phase relationship.

FIG. 1 shows the equivalent block diagram of squirrel cage induction motor developed on this $\alpha$-$\beta$ coordinate. A more detailed description of the method of forming this equivalent block diagram shown in FIG. 1 is made in a reference: K. Ohnishi, T. Sugiura and K. Miyachi, "About the decoupling control in induction motor drive", Report of IEE of Japan, RM-81-1, February, 1981.

The above expression (2) indicates that if the secondary magnetic flux $\lambda_{2\alpha}$ or $\lambda_{2\beta}$ is constant, the torque is then completely proportional to the secondary current $i_{2\beta}$ or $i_{2\alpha}$. In order to control the induction motor as in a DC motor, it is necessary to adopt the vector control method. In this vector control method, both the vectors of the secondary magnetic flux $\lambda_2$ and the secondary driving current $i_2$ are controlled independently so as to meet at right angles to each other. Although it is possible to determine the $\alpha$- and $\beta$-axis in any way, it is preferable to determine the $\alpha$-axis to be in the direction of the secondary magnetic flux $\lambda_2$ and the $\beta$-axis to be in the direction of the secondary driving current $i_2$. If determined as described above, the condition that $\lambda_2$ and $i_2$ meet at right angles to each other are as follows:

$$\lambda_{2\alpha}(i_{1\alpha}) = \text{const}, \lambda_{2\beta} = 0 \quad (3)$$

$$i_{2\alpha} = 0, i_{2\beta}(i_{1\beta}) = \text{variable}$$

The above expression indicates that the secondary magnetic flux $\lambda_{2\alpha}$ is controlled at a constant value only on the $\alpha$-axis and the secondary driving current $i_{2\beta}$ is variably controlled only on the $\beta$-axis, as in a DC motor.

The above conditions indicated by expression (3) can be attained by controlling the slip angular frequency as follows:

$$w_s = w_0 - w_r = \frac{Mr_2}{L_2\lambda_{2\alpha}} \cdot i_{1\beta} \quad (4)$$

where $w_s$ denotes the slip angular frequency.

Once the $\alpha$ and $\beta$ axes are determined as described above, the primary current $\alpha$-axis component $i_{1\alpha}$ corresponds to the secondary magnetic flux $\lambda_{2\alpha}$ and the primary current $\beta$-axis component $i_{1\beta}$ corresponds to the secondary driving current $i_{2\beta}$.

The above expressions (3) and (4) are essential to decouple the secondary flux from the secondary current but are not perfect, since there still remains the electromotive force caused by the mutual interference (cross terms) between $\alpha$-axis component and $\beta$-axis component on the primary side.

Now, the conditions defined by expressions (3) and (4) are applied to the block diagram shown in FIG. 1.

Then, point a shown in FIG. 1 is zero on the basis of expression (4) if $r_2 = 0$ therefore $e_{2\beta} = 0$, because $$i_{1\beta}\left(\frac{M}{L_2} r_2\right) + -\lambda_{2\alpha}(w_0 - w_r) = 0.$$

Point b is zero because $\lambda_{2\alpha}$ = constant and therefore $P\lambda_{2\alpha} = 0$. Point c is zero because $\lambda_{2\beta} = 0$. Point d is zero, because $i_{2\alpha} = 0$. Further, the portion A enclosed by dashed square can be calculated as follows:

$$e_{1\beta} = \text{(calculation along arrow } A_1) +$$
$$\text{(calculation along arrow } A_2)$$

$$= i_{1\alpha} \cdot L_\sigma w_0 + i_{1\alpha}\left(\frac{M}{L_2} r_2\right)\left(\frac{L_2}{L_2P + r_2}\right)\left(\frac{M}{L_2}\right) w_0$$

$$= \left(L_\sigma + \frac{M}{L_2} r_2 \cdot \frac{L_2}{L_2P + r_2} \cdot \frac{M}{L_2}\right) w_0 i_{1\alpha}$$

if $L_2/r_2 = \tau_2$ and $L_\sigma = \frac{L_1L_2 - M^2}{L_2}$ $$= \left(L_\sigma + \frac{M^2/L_2}{\tau_2P + 1}\right) w_0 i_{1\alpha}$$

$$= \left(\frac{L_\sigma \tau_2 P + L_\sigma + M^2/L_2}{\tau_2P + 1}\right) w_0 i_{1\alpha}$$

$$= \left(\frac{L_\sigma \tau_2 P + \frac{L_1L_2 - M^2}{L_2} + \frac{M^2}{L_2}}{\tau_2P + 1}\right) w_0 i_{1\alpha}$$

$$= \left(\frac{\frac{L_\sigma}{L_1} \tau_2 P + 1}{\tau_2P + 1}\right) L_1 w_0 i_{1\alpha}$$

since $i_{1\alpha}$ = const, P = 0. Therefore, $e_{1\beta} = L_1 w_0 i_{1\alpha}$.

On the other hand, the portion B enclosed by dashed square can be calculated as follows:

$$e_{1\alpha} = \text{(calculation along arrow } B_1)$$
$$+ \text{(calculation along arrow } B_2)$$
$$= i_{1\beta} \cdot L_\sigma w_o = 0 \text{ (Since point } a \text{ is zero).}$$

Figure 2:
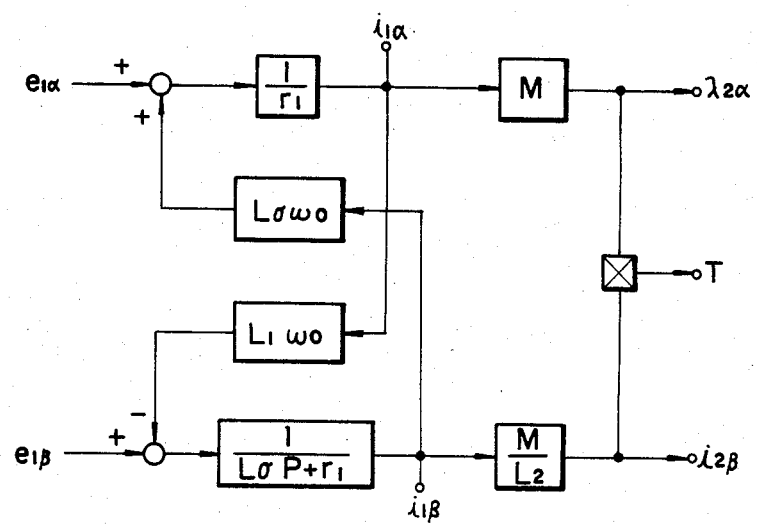
FIG. 2 is an equivalent schematic block diagram of a vector-controlled induction motor, which is obtained by giving FIG. 1 the conditions that the primary current corresponding to the secondary magnetic flux and the primary current corresponding to the secondary driving current are controlled so as to meet at right angles to each other and further the mutual interference between the both is cancelled out.

As described above, the block diagram of an induction motor shown in FIG. 1 can be simplified into the one shown in FIG. 2 under the conditions defined by expressions (3) and (4).

FIG. 2 indicates that (1) the secondary $\alpha$-axis magnetic flux $\lambda_{2\alpha}$ is not determined only by the primary $\alpha$-axis voltage $e_{1\alpha}$ but is subject to the interference influence of component $+L_\sigma w_0 i_{1\beta}$ due to the primary $\beta$-axis current $i_{1\beta}$ and (2) the secondary $\beta$-axis current $i_{2\beta}$ is not determined only by the primary $\beta$-axis voltage $e_{1\beta}$ but is subject to the interference influence of component $-L_1 w_0 i_{1\alpha}$ due to the primary $\alpha$-axis current $i_{1\alpha}$.

To overcome the above problem, it is preferable to previously compensate the primary voltages $e_{1\alpha}$ and $e_{1\beta}$ against the interference influence, that is, to decouple the secondary magnetic flux $\lambda_{2\alpha}$ from the primary voltage $e_{1\beta}$ and the secondary driving current $i_{2\beta}$ from the primary voltage $e_{1\alpha}$.

As readily understood in FIG. 2, the above decoupling control can be achieved by cancelling out these two cross terms, that is, by synthesizing the primary voltages $e_{1\alpha}$ and $e_{1\beta}$ with both the reference primary currents $i^*_{1\alpha}$ and $i^*_{1\beta}$ and the cancelling values defined as follows:

$$e_{1\alpha} = r_1 i^*_{1\alpha} - L_\sigma w_0 i^*_{1\beta}$$

$$e_{1\beta} = r_1 i^*_{1\beta} + L_1 w_0 i^*_{1\alpha} \qquad (5)$$

wherein $$e^*_{1\alpha} = i^*_{1\alpha} \cdot r_1$$

$$e^*_{1\beta} = i^*_{1\beta} \cdot r_1 + L_\sigma P$$

where the upper suffix * denotes the reference or command value applied from the outside when a motor is driven.

The above expressions indicate the decoupling condition. In more detail, in order to determine the primary voltage $e_{1\alpha}$, the value $L_\sigma w_0 i^*_{1\beta}$ obtained by multiplying the reference primary current $i^*_{1\beta}$ (which controls the secondary current $i_{2\beta}$) by supply voltage angular frequency $w_0$ and coefficient $L_\sigma$, is subtracted from the value $r_1 i^*_{1\alpha}$, obtained by multiplying the reference primary current $i^*_{1\alpha}$ (which controls the secondary flux $\lambda_{2\alpha}$ at a constant level) by the primary resistance $r_1$. Similarly, in order to determine the primary voltage $e_{1\beta}$, the value $L_1 w_0 I^*_{1\alpha}$ obtained by multiplying the reference primary current $i^*_{1\alpha}$ by supply voltage angular frequency $w_0$ and coefficient $L_1$ is added to the value $r_1 i^*_{1\beta}$ obtained by multiplying the reference primary current $i^*_{1\beta}$ by the primary resistance $r_1$.

In expression (4), since $\lambda_{2\alpha}$ is constant (or $i_{1\alpha}$ is constant), slip frequency $w_s$ is proportional to the primary current $i_{1\beta}$.

In summary, the expressions (4) and (5) are necessary and sufficient conditions to decouple the secondary flux and the secondary current and to keep the magnitude of the secondary flux $\lambda_{2\alpha}$ (i.e. $i_{1\alpha}$) constant in driving an induction motor by means of a voltage-controlled power source.

In order to realize the decoupling control, the values of the primary current $i_{1\alpha}$ corresponding to the secondary flux $\lambda_{2\alpha}$ and the primary current $i_{1\beta}$ corresponding to the secondary current $i_{2\beta}$ are necessary for controlling information in addition to rotor angular frequency $w_r$. It is more practical to use reference or command values in the actual control. The reference primary current $i^*_{1\alpha}$ can be obtained on the basis of the reference secondary flux $\lambda^*_{2\alpha}$ as shown below. Similarly, the reference primary current $i^*_{1\beta}$ can be obtained on the basis of both the reference torque $T^*$ and the reference secondary flux $\lambda^*_{2\alpha}$ as follows:

$$i^*_{1\alpha} = \lambda_{2\alpha}/M$$

$$i^*_{1\beta} = \frac{L_2}{M\lambda^*_{2\alpha}} T^*$$

This is because $$T = i_{2\beta} \cdot \lambda_{2\alpha} = \left( i_{1\beta} \cdot \frac{M}{L_2} \right) \cdot \lambda_{2\alpha}$$

in FIG. 2.

The secondary reference flux $\lambda^*_{2\alpha}$ is constant and therefore the reference torque $T^*$ can be determined by the primary reference current $i^*_{1\beta}$ obtained through the PI speed controller (proportional integrator) by which the difference between the reference rotor angular velocity $w^*_r$ and the actual rotor angular velocity $w_r$ are integrated.

Figure 3A:
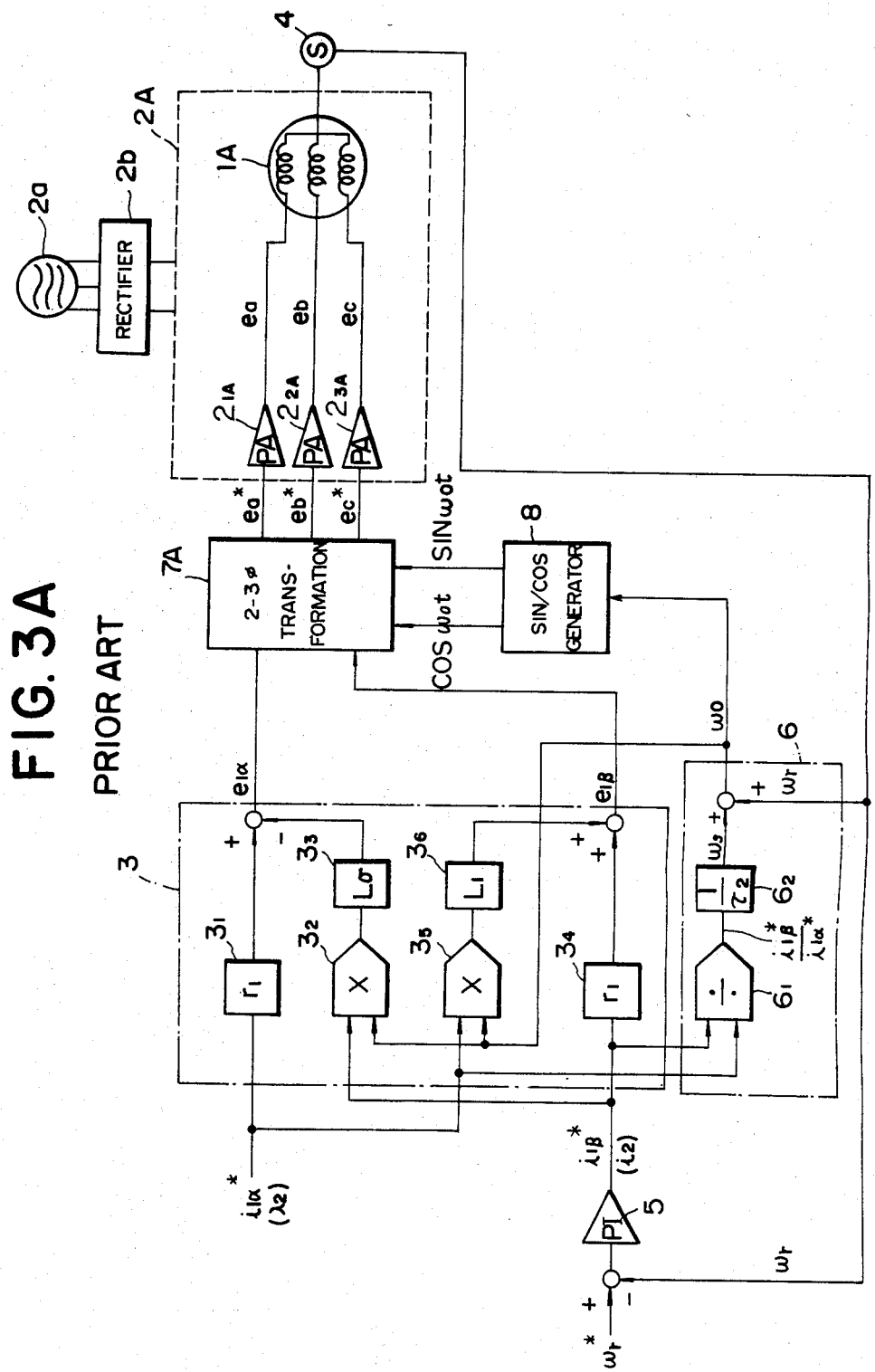
FIG. 3A is an example of a prior-art schematic block diagram showing a decoupled-vector control system, in which three power amplifiers are adopted for driving a 3-phase induction motor.

FIG. 3A shows an example of the block diagram of decoupled-vector control system for a three-phase induction motor. An induction motor 1A is driven by the primary voltage supplied from a power amplifier unit 2A to which a three-phase AC power supply 2a is applied through an appropriate rectifier 2b. A decoupling calculating unit 3 calculates the decoupling values $(-L_\sigma w_0 i^*_{1\beta}, L_1 w_0 i^*_{1\alpha})$ in order to output the primary voltages $e_{1\alpha}$ and $e_{1\beta}$ in response to the primary reference current $i^*_{1\alpha}$ (constant secondary flux $\lambda_{2\alpha}$) and the primary reference current $i^*_{1\beta}$ (variable secondary current $i_{2\beta}$) in accordance with the expression (5).

The numerals $3_1$ and $3_4$ denote coefficient $(r_1)$ multipliers. The numerals $3_2$ and $3_5$ denote multipliers. The numerals $3_3$ and $3_6$ denote inductance ($L_\sigma$ or $L_1$) multipliers. The numeral 4 denotes a speed sensor for detecting the rotor angular frequency $w_r$ of the induction motor 1A. The numeral 5 denotes a proportional integrator (PI) for integrating the difference between the reference (target) rotor angular frequency $w^*_r$ and the actual rotor angular frequency $w_r$ in order to determine the primary reference current $i^*_{1\beta}(1_{2\beta})$.

The numeral 6 denotes a supply voltage angular frequency calculator for calculating the supply voltage angular frequency $w_0$, which includes a divider $6_1$ for dividing the primary reference current $i^*_{1\beta}$ by the primary reference current $i^*_{1\alpha}$ and a coefficient $(1/\tau_2)$ multiplier $6_2$. The supply voltage angular frequency $w_0$ defined by expression 4 can be calculated by this calculator 6 as follows:

$$w_0 = w_r + w_s \text{ (slip frequency)}$$

$$= w_r + \frac{i^*_{1\beta}}{i^*_{1\alpha}} \cdot \frac{1}{\tau_2}$$

since $\tau_2 = L_2/r_2$ $$= w_r + \frac{i^*_{1\beta}}{i^*_{1\alpha}} \cdot \frac{r_2}{L_2}$$

since $\lambda_{2\alpha} = i_{1\alpha} \cdot M$ $$= w_r + \frac{Mr_2}{L_2 \lambda_{2\alpha}} i^*_{1\beta}$$

The numeral 7A denotes a 2–3 phase transforming unit for generating three-phase reference voltages $e^*_a$, $e^*_b$, $e^*_c$ on the basis of the decoupled primary voltage $e_{1\alpha}$ and $e_{1\beta}$ and trigonometric functions.

The reference voltages $e^*_a$, $e^*_b$, $e^*_c$ can be obtained by the following expressions:

$$e_{1d} = \cos w_0 t \cdot e_{1\alpha} - \sin w_0 t \cdot e_{1\beta}$$

$$e_{1q} = \sin w_0 t \cdot e_{1\alpha} + \cos w_0 t \cdot e_{1\beta} \qquad (6)$$

-continued $$e^*_a = e_{1d}$$

$$e^*_b = -\frac{1}{2} e_{1d} - \frac{\sqrt{3}}{2} e_{1q} \qquad (7)$$

$$e^*_c = -\frac{1}{2} e_{1d} + \frac{\sqrt{3}}{2} e_{1q}$$

The expressions (6) indicate that the primary voltages $e_{1\alpha}$, $e_{1\beta}$ represented on the two-phase synchronously-rotating $\alpha$-$\beta$ coordinate can be transformed into those on two-phase fixed d-q coordinate.

The expressions (7) indicate that the primary voltages $e_{1d}$, $e_{1q}$ represented on the two-phase fixed d-q coordinate can be transformed into the ordinary fixed three-phase primary reference voltages $e^*_a$, $e^*_b$, $e^*_c$.

The numeral 8 denotes a sin/cos wave signal generator described in greater detail later.

The power amplifier unit 2A includes three independent amplifiers $2_{1A}$, $2_{2A}$, $2_{3A}$, which all amplify the primary reference voltage signals $e^*_a$, $e^*_b$, $e^*_c$, respectively, in order to drive the induction motor 1A.

Figure 3B:
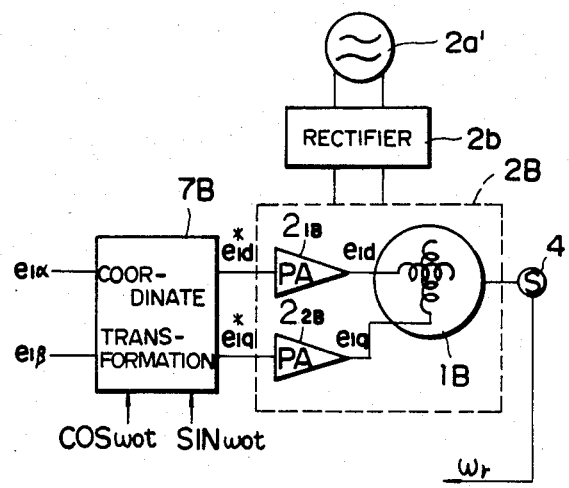
FIG. 3B is a similar example of a prior-art schematic block diagram showing a decoupled-vector control system, in which two power amplifiers are adopted for driving a 2-phase induction motor.

In general, a three-phase induction motor 1A is used. However, in the case where a relatively small torque is required, a two-phase induction motor 2B can be used as shown in FIG. 3B. In such case, another coordinate transforming unit 7B is adopted. That is to say, the primary voltages $e_{1\alpha}$, $e_{1\beta}$ are transformed only into the primary voltage $e^*_{1d}$, $e^*_{1q}$ in accordance with only the expressions (6), without transforming two-phase primary voltages into three-phase primary voltages.

The calculated reference signals $e^*_{1d}$, $e^*_{1q}$ are both directly amplified through the power amplifiers $2_{1B}$ and $2_{2B}$, respectively, to drive the two-phase induction motor 1B. Further, in the system shown in FIG. 3B, two phase power supply $2a'$ can be used.

Figure 3C:
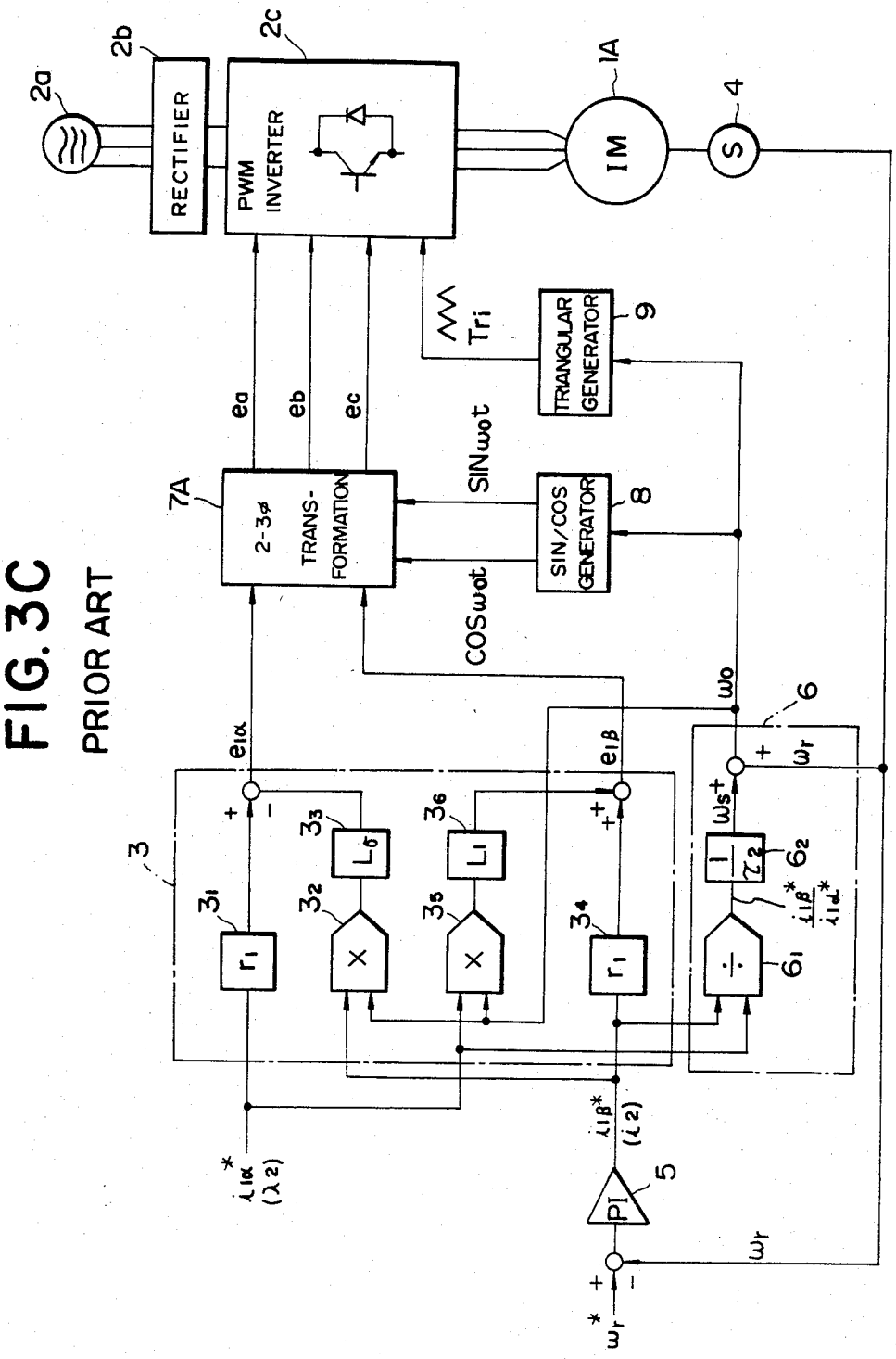
FIG. 3C is a similar example of a prior-art schematic block diagram showing a decoupled-vector control system, in which a PWM inverter is adopted for driving a 3-phase induction motor.

FIG. 3C shows the block diagram of the decoupled-vector control system for a three-phase induction motor, in which a PWM inverter 2C is incorporated. In such a system, a triangular wave signal generator 9 is additionally incorporated in the system.

The PWM inverter 2C generates three PWM (pulse width modulated) signals in response to the reference voltage signals $e^*_a$, $e^*_b$, $e^*_c$ and the triangular wave signal $T_{ri}$. To generate the PWM signals, the voltage level of each of the reference voltage signals is compared with that of the triangular signal independently. While the reference voltage signal exceeds the triangular wave signal in voltage level, a pulse the width of which is pulse-width-modulated is generated. In more detail, the high-voltage (ON) time period of the PWM signal is from when the instantaneous voltage level of the reference signal rises beyond that of the triangular signal to when the instantaneous voltage level of the reference signal drops below that of the triangular signal. Therefore, the higher the reference signal voltage level, the longer the pulse width of the PWM signal. In response to these PWM signals, switching elements such as silicon controlled rectifiers provided in the inverter 2C are fired to generate the primary voltage signals by which the speed or the torque of the induction motor 1A is controlled under decoupled vector control condition between the secondary magnetic flux and the secondary driving current.

In view of the above description, reference is now made to the first feature of the present invention. The first feature is to configure the system as simple as possible in the decoupled-vector control system.

In the prior-art system configuration shown in FIGS. 3A and 3C, the decoupling calculating unit 3 and the 2-3 phase transforming unit 7A are provided separately for implementing the calculation defined by expressions (6) and (7).

In this first embodiment, however, the two calculations are implemented at the same time. In more detail, the reference voltages $e^*_a$, $e^*_b$, $e^*_c$ applied to the voltage-controlled type inverter 2C, are directly calculated by substituting expression (5) into expression (6) as follows:

$$e_{1d} = (r_1 i^*_{1\alpha} - w_0 L_\sigma i^*_{1\beta}) \cos w_0 t - (r_1 i^*_{1\beta} + w_0 L_1 i^*_{1\alpha}) \sin w_0 t.$$

Since $-w_0 \sin w_0 t = (d/d_t)(\cos w_0 t) = S \cdot \cos w_0 t$ and $w_0 \cos w_0 t = (d/d_t)(\sin w_0 t) = S \cdot \sin w_0 t$ (S denotes differentiation operator)

$$e_{1d} = (r_1 + L_1 S) \cos w_0 t \cdot i^*_{1\alpha} - (r_1 + L_\sigma S) \sin w_0 t \cdot i^*_{1\beta} \qquad (8)$$

Similarly, $$e_{1q} = (r_1 + L_1 S) \sin w_0 t \cdot i^*_{1\alpha} - (r_1 + L_\sigma S) \cos w_0 t \cdot i^*_{1\beta} \qquad (9).$$

The above expressions (8) and (9) indicate that the primary voltage on the fixed d-q coordinate can be directly obtained by the primary reference current $i_{1\alpha}$ and $i_{1\beta}$ including the decoupling conditions defined by expression (5), without separately calculating the decoupling condition and $\alpha$-$\beta$ to d-q coordinate transforming condition.

Figures 5A, 5B:
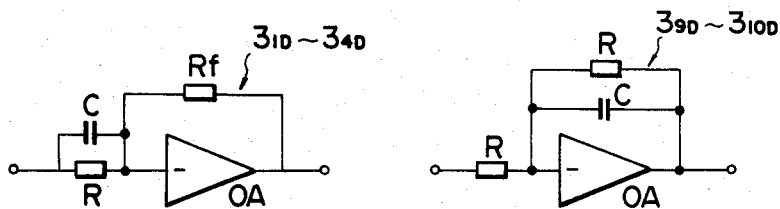
FIG. 5A is a schematic block diagram representing an example of the proportional differentiator unit incorporated in the system shown in FIG. 4.
FIG. 5B is a schematic block diagram representing an example of the first-order delay integrator unit incorporated in the system shown in FIG. 4.
Figure 4:
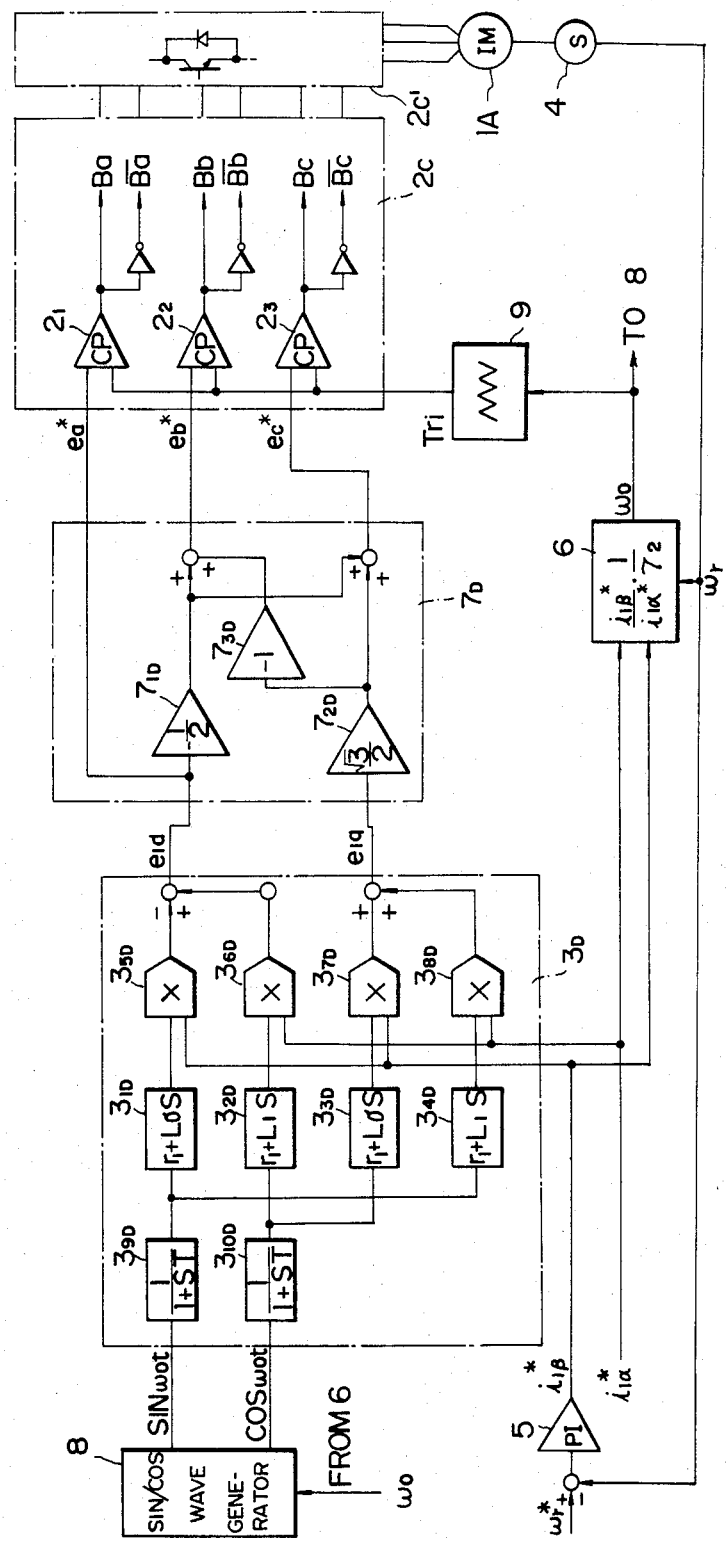
FIG. 4 is a schematic block diagram showing an essential portion of the decoupled-vector control system for an induction motor according to the present invention, in which the decoupling calculation unit and the 2-3 phase transformation unit are combined into a simpler system configuration, for assistance in explaining the first feature according to the present invention.

FIG. 4 shows a more detailed block diagram of the essential portions of the system according to the present invention. A decoupling calculating unit 3D includes four proportional differentiating (PD) units $3_{1D}$, $3_{2D}$, $3_{3D}$, $3_{4D}$, four multiplying units $3_{5D}$, $3_{6D}$, $3_{7D}$, $3_{8D}$, and two integrators $3_{9D}$ and $3_{10D}$, in order to obtain $e_{1d}$ or $e_{1q}$ in accordance with the expressions (8) and (9). The proportional differentiating units $3_{1D}$–$3_{4D}$ calculate the multiplication of sin $w_0 t$ or cos $w_0 t$ by $(r_1 + L_\sigma S)$ or $(r_1 + L_1 S)$. An example of these units is shown in FIG. 5(a), in which an operational amplifier OA is adopted. The transfer function determined by the feedback resistance $R_f$, input resistance $R_i$ and input capacitance C is so designed as to match the coefficients $r_1$ and $L_1$ or $L_\sigma$, respectively.

The multiplying units $3_{5D}$–$3_{8D}$ calculate the multiplication of proportional differentiating unit output by the primary reference current $i^*_{1\beta}$ or $i^*_{1\alpha}$. The integrating units $3_{9D}$ and $3_{10D}$ are elements having the first-order delay. These elements serve as eliminating high-frequency noise components superimposed upon the sine- or cosine-wave signals. An example of these units is shown in FIG. 5(b), in which an operational amplifier is adopted. The time constant T(=CR) of the first-order delay integrating unit is determined to be sufficiently small as compared with the angular frequency $w_0$ of the sine- or cosine-wave signals. That is to say, the time constant is sufficiently small as to neglect the influence of delay upon the induction motor in the control frequency range, while eliminating the higher frequency components due to noise. The reason why these noise eliminating elements are necessary is that high-frequency noise signals are inevitably included in the sineor cosine-wave signals in the case where the sine/cosine generator is configured in digital fashion.

By the case of the above-mentioned decoupling calculating unit 3D, it is possible to obtain the voltages $e_{1d}$, $e_{1q}$ in accordance with expressions (8) and (9).

A 2-3 phase transformation unit 7D includes a first inversion amplifier $7_{1D}$ having a gain of $\frac{1}{2}$, a second amplifier $7_{2D}$ having a gain of $$\sqrt{3}/2,$$

and a third inversion amplifier $7_{3D}$ having a gain of 1 for calculating three phase reference control voltages $e^*_a$, $e^*_b$, $e^*_c$ in response to the d-q coordinate primary voltages $e_{1d}$ and $e_{1q}$ in accordance with the expression (7). In more detail, the value $e^*_a$ is directly obtained from the decoupling calculating unit 3D; the value $e^*_b$ is obtained by adding the output ($-\frac{1}{2}e_{1d}$) of the first inversion amplifier $7_{1D}$ and the output $$\left(-\frac{\sqrt{3}}{2}e_{1q}\right)$$

of the third inversion amplifier $7_{3D}$ connected to the second amplifier $7_{2D}$; the value $e^*_c$ is obtained by adding the output ($-\frac{1}{2}e_{1d}$) of the first invention amplifier $7_{1D}$ and the output $$\left(\frac{\sqrt{3}}{2}e_{1q}\right)$$

of the second amplifier $7_{2D}$.

These three phase reference voltages $e^*_a$, $e^*_b$, $e^*_c$ are compared with the voltage level of the triangular wave signal $T_{ri}$ outputted from the triangular wave generator 9, separately, by three comparators $2_1$, $2_2$, $2_3$ provided in the inverter 2C, in order to generator three PWM control signals $B_a$, $B_b$ and $B_c$ or $\overline{B}_a$, $\overline{B}_b$ and $\overline{B}_c$ which trigger the three main switching elements provided in the inverter 2C.

Reference is now made to the second feature of the present invention. In order to drive an induction motor in the same manner as in a DC motor, four-quadrant operation is indispensable. This four-quadrant operation will be described hereinbelow. As depicted in FIG. 6A, when the rotor angular frequency $w_r$ is taken as abscissa and the motor torque T is taken as ordinate, the first quadrant indicates that a motor is driven in the normal rotational direction; the second quadrant indicates that the motor is braked while rotating in the normal direction; the third quadrant indicates that the motor is driven in the reverse rotational direction; the fourth quadrant indicates that the motor is braked while rotating in the reverse direction.

In other words, in the first quadrant, the motor torque T is positive and the rotor angular frequency $w_r$ also is positive; in the second quadrant, T is negative but $w_r$ is positive; in the third quadrant, T is negative and $w_r$ is also negative; in the fourth quadrant, T is positive but $w_r$ is negative, as depicted in FIG. 6B.

FIG. 6C shows an example in which a motor rotating in the normal direction is switched to the reverse direction at time $t_1$. In more detail, when a motor is rotating in the 1st quadrant operation (T>0, $W_r$>0), if the reference frequency (speed) $+w^*_r$ is switched to $-w^*_r$, the motor rotates in the 2nd quadrant operation (T<0, $w_r$<0) (the motor is braked or the motor torque is absorbed). The instant the rotor frequency reaches zero, the motor begins to rotate in the 3rd quadrant operation (T<0, $w_r$<0) (the motor is driven in the reverse direction).

To achieve four-quadrant motor operation in the decoupled-vector control system for an induction motor according to the present invention, the actual or reference motor angular frequency (speed) $w_r$ or $w^*_r$ is determined to be positive when a motor is rotating in the normal direction and negative when rotating in the reverse direction. Under such conditions, the primary reference current $i^*_{1\beta}$ (corresponding to secondary driving current) is always positive whenever the reference angular frequency $w^*_r$ is higher than the actual angular frequency $w_r$ irrespective of the motor rotational direction. That is, $+i^*_{1\beta}$ indicates a positive reference torque and therefore the slip angular frequency $w_s = w_0 - w_r$ ($w_0$: supply voltage frequency) also becomes positive. In contrast with this, $-i^*_{1\beta}$ is always negative whenever $w^*_r$ is lower than $w_r$. That is, $-i^*_{1\beta}$ indicates a negative reference torque and therefore $w_s$ also becomes negative.

In summary, every angular frequency $w_r$, $w^*_r$, $w_0$, $w_s$ is processed in consideration of plus and minus signs.

Reference is now made to the third feature of the present invention. The third feature is to configure the sine/cosine wave generator 8 and the triangular wave generator 9 in such a way that the ratio of the sine- or cosine-wave signal frequency to the triangular wave signal frequency is adjusted according to the magnitude of the supply voltage angular frequency $w_0$ while synchronizing the sine- or cosine-wave signals with the triangular wave signal. In other words, the number of the triangular (carrier) wave signals generated during one period of the supply voltage signal is increased with decreasing supply voltage frequency in order to improve the response characteristics when the induction motor is rotating at a low speed.

In obtaining PWM signals between the three reference voltage $e^*_a$, $e^*_b$, $e^*_c$ and the triangular wave signal $T_{ri}$, these two signals should be synchronized with each other. Otherwise, the modulation readily generates direct-current components and even-order higher harmonics, thus resulting in torque fluctuations. In order to make synchronization of this 3-phase reference voltage with the triangular wave signal, the sine wave $\sin w_0 t$ and cosine wave $\cos w_0 t$ used when calculating the reference voltage should be synchronized with the triangular wave signal $T_{ri}$. In other words, the sine and cosine wave signals and the triangular wave signals should be generated in response to clock pulses generated in synchronization with the supply voltage angular frequency $w_0$.

In the conventional PWM control system, however, since the number of triangular wave signals generated during one period of the sine- or cosine-wave signal is fixedly determined, the lower the supply voltage angular frequency $w_0$ (the lower the motor speed), the lower the triangular wave signal frequency.

Since a longer period of the triangular wave signal results in a longer waste time (because the OFF time interval of the PWM signal becomes long), the low-frequency triangular wave signal exerts a harmful influence upon the response speed in controlling induction motor speed. That is to say, there exists a problem in that the lower the supply voltage frequency $w_0$, the lower the response speed and additionally higher harmonic currents increase.

Figure 7:
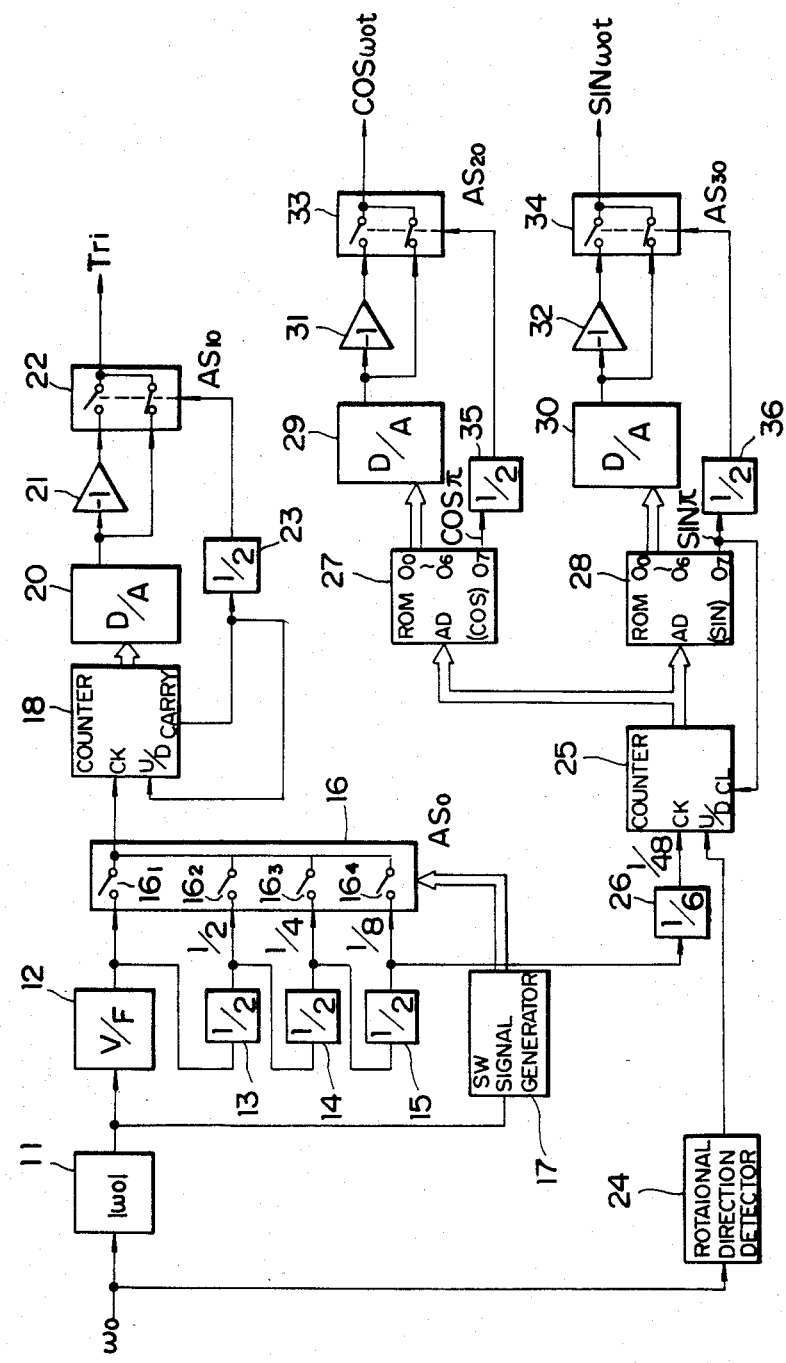
FIG. 7 is a schematic block diagram of the triangular wave signal generating unit and the sin/cos wave signal generating unit used with the decoupled-vector control system for an induction motor according to the present invention.

FIG. 7 shows an embodiment of the SIN/COS wave signal generator and the triangular wave signal generator according to the present invention.

The triangular wave signal generator is made up of an absolute value detecting unit 11, a V-F converter 12, dividers 13, 14, and 15, a switching unit 16, a switching signal generator 17, an up-down counter 18, a D-A converter 20, an inversion amplifier 21, a switch 22, and another divider 23.

The absolute value detecting unit 11 generates a voltage signal the level of which is proportional to the magnitude of supply voltage angular frequency $w_0$ irrespective of the positive and negative value of $w_0$. The positive value of $w_0$ is obtained when an induction motor rotates in the normal direction; the negative value of $w_0$ is obtained when the induction motor rotates in the reverse direction.

The V-F converter 12 converts the output signal of the absolute value detecting unit 11 into a signal the frequency of which is proportional to the voltage level of the output of the unit 11. Therefore, the higher the supply voltage frequency, the higher the frequency of the pulse signal outputted from the V-F converter 12.

Figure 8A:
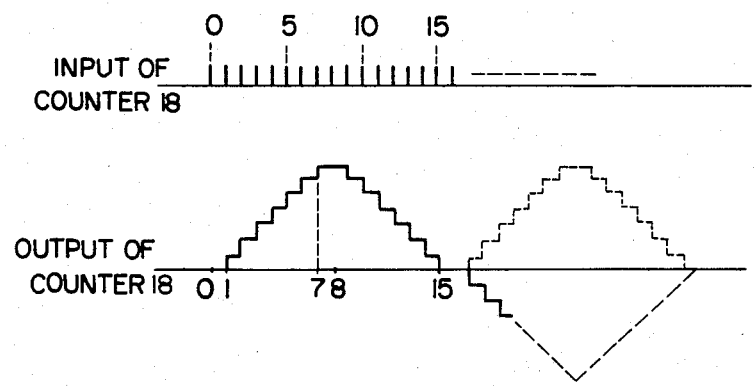
FIG. 8(A) is a graphical representation showing the digital triangular wave signal outputted from the up-down counter incorporated in the triangular generating unit shown in FIG. 7.

The dividers 13, 14 and 15 divide the frequency of the pulse signal from the V-F converter 12 into half, respectively. The switching unit 16 switches the pulse signals from the V-F converter 12 and the dividers 13, 14, 15 in response to a switching signal $AS_0$ outputted from the switching signal generator 17. In FIG. 7, the double line indicates a plurality of conductive lines. The switching signal generator 17 outputs a first switching signal $AS_1$ to close the contact $16_1$ of the switching unit 16 when the supply voltage frequency $w_0$ is very low, a second switching signal $AS_2$ to close the contact $16_2$ when the frequency is low, a third signal $AS_3$ to close the contact $16_3$ when the frequency is medium, and a fourth signal $AS_4$ to close the contact $16_4$ when the frequency is high, respectively. That is to say, the switching signal generator 17 outputs separate switching signals ($AS_1$–$AS_4$) according to the magnitude of the supply voltage frequency $w_0$. The up-down counter 18 counts up or down the clock pulse signals from the switching unit 16, repeatedly, while outputting a carry signal to the up-down switching terminal (U/D) of the counter itself. For instance, if the counter 18 is made up of three bits, when the counter 18 has counted up the pulse signals of $8=2^3$, a carry signal is generated to switch the counter 18, so that the counter 18 next counts down the pulse signal. When the counter 18 has counted down the pulse signal of 8, the counter 18 next counts up the pulse signal as depicted by dashed lines in FIG. 8A. The D-A converter 20 converts the digital values from the up-down counter 18 into the analog values corresponding thereto. The inversion amplifier 21 with a gain of 1 inverts the output values from the D-A converter 20. The switch 22 outputs a triangular wave (carrier) signal Tri by selecting either of the output values from the D-A converter 20 and the output values from the inversion amplifier 21 in response to a switching signal $AS_{10}$ outputted from the divider 23. Since the up-down counter 18 outputs a half-wave of a triangular signal repeatedly, there exists a need for inverting each half-wave signal alternately, that is, for each half period of the triangular wave signal from the D-A converter 20, as depicted by the solid lines in FIG. 8A.

The SIN/COS wave signal generator is made up of a rotational direction detector 24, another up-down counter 25, a divider 26, two read-only memories 27 and 28, two D-A converters 29 and 30, two inversion amplifier 31 and 32, two switches 33 and 34, and two dividers 35 and 36.

The rotational direction detector 24 detects the rotational direction of the motor and outputs an up signal when the motor rotates in the normal direction and a DOWN signal when the motor rotates in the reverse direction.

The up-down counter 25 counts the pulse signal supplied from the divider 15 through the additional divider 26 of 1/6 in response to the signal from the rotational direction detector 24. That is to say, the counter 25 counts up the pulse signals when the motor rotates in the normal direction and counts down the pulse signals when the motor rotates in the reverse direction.

The ROM 27 stores sample data corresponding to the half period of a cosine curve and outputs each sample data sequentially in response to the count signals outputted from the up-down counter 25. Additionally the ROM 27 outputs a signal indicative of $\cos \pi$ after the half period sample data have all been outputted. For instance, when the ROM 27 stores 8 sample data, the $\cos \pi$ signal is outputted after the 7 sample data signals have been outputted.

Figure 8B:
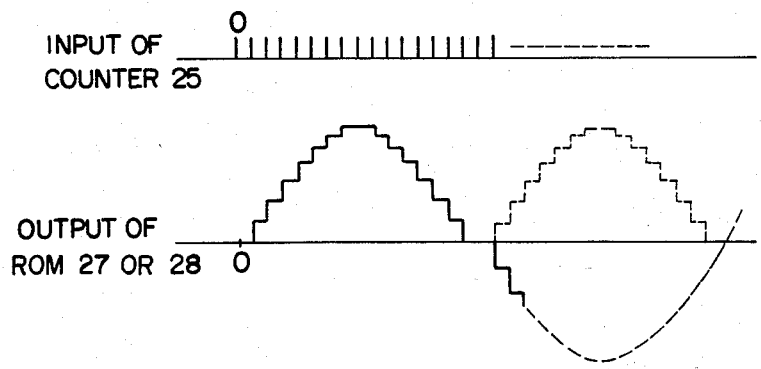
FIG. 8(B) is a graphical representation showing the digital sin or cos wave signal outputted from the ROM incorporated in the sin/cos generating unit shown in FIG. 7.

The D-A converter 29 converts the digital values from the ROM 27 into the analog values corresponding thereto. The inversion amplifier 31 with a gain of 1 inverts the output values from the D-A converter 29. The switch 33 outputs a cosine wave signal $\cos w_0 t$ by selecting either of the output values from the D-A converter 29 and the output values from the inversion amplifier 31 in response to the $\cos \pi$ signal $AS_{20}$ outputted from the divider 35. This is because since the ROM 27 outputs a half-wave of a cosine signal repeatedly, there exists a need for inverting each half-wave signal alternately, that is, for each half period of the cosine wave signal from the D-A converter 29, as depicted by the solid line in FIG. 8B.

Similarly, the ROM 28 stores sample data corresponding to the half period of a sine wave and outputs each sample data sequentially in response to the count signal outputted by the up-down counter 25. Additionally the ROM 29 outputs a signal indicative of $\sin \pi$ after the half period sample data have all been outputted. For instance, when the ROM 28 stores 8 sample data, the $\sin \pi$ signal is outputted after the 7 sample data signals have been outputted.

The D-A converter 30 converts the digital values from the ROM 28 into the analog values corresponding thereto. The inversion amplifier 32 with a gain of 1 inverts the output values from the D-A converter 30. The switch 34 outputs a sine wave signal $\sin w_0 t$ by selecting either of the output values from the D-A converter 30 and the output values from the inversion amplifier 32 in response to a $\sin \pi$ signal $AS_{30}$ outputted from the divider 36. This is because since the ROM 28 outputs a half-wave of a sine signal, there exists a need for inverting each half-wave signal alternately, that is, for each half period of the sine wave signal from the D-A converter 30, as depicted by the dashed lines in FIG. 9. Further, the signal indicative of $\sin \pi$ is applied to the CLEAR terminal of the up-down counter 25 to repeat the above-mentioned operation, because the ROMs 27 and 28 stores only the sample data corresponding to half period of sine or cosine wave.

The second feature (four quadrant operation) of the present invention can be achieved as follows: The rotational direction detector 24 detects the plus or minus sign of the supply voltage frequency $w_0$. If the $w_0$ is positive, this indicates that the motor is rotating in the normal direction, and the detector 24 outputs an up-count signal to the up-down counter 25. In this case, the counter 25 counts up the clock signals and outputs each address designation signal to the ROM 27 and 28 in order to generate each sine or cosine sample data, so that $+\sin w_0 t$ signal and $+\cos w_0 t$ signal are generated. Therefore, the reference primary voltages $e_{1d}$, $e_{1q}$ for driving the motor in the normal direction are calculated in accordance with expressions (8) and (9).

If the $w_0$ is negative, this indicates that the motor is rotating in the reverse direction, the detector 24 outputs a down-count signal to the up-down counter 25. In this case, the counter 25 counts down the clock signals and outputs each address designation signal to the ROM 27 and 28 to in order to generate read each sine or cosine sample data, so that $\sin(-w_0 t) = -\sin w_0 t$ and $\cos(-w_0 t) = \cos w_0 t$ are generated. Therefore, the reference primary voltages $e_{1d}$, $e_{1q}$ for driving the motor in the reverse direction are calculated in accordance with expressions (8) and (9). In summary, by switching the counter 25 from up-count to down-count or vice versa it is possible to switch the motor revolution from the normal direction to the reverse direction or vice versa. Further, it should be noted that since the initial value of the sine or cosine wave does not change when the up- or down-count is switched, it is possible to smoothly change the rotational direction of the motor.

The third feature (the relationship between the triangular wave signal $T_{ri}$ and the trigonometric function signals) according to the present invention will be described numerically hereinbelow. If the sample data for a half period of a sine wave are stored in the ROM 28 being divided or quantized into 112 segments, whenever the up-down counter 25 counts 224 clock pulses, one period of a sine wave signal is outputted. Further, assumption is made that the counter 18 is made up of 4 bits; that is, $\frac{1}{4}$ period of a triangular wave signal is outputted whenever the counter 18 counts 16 ($2^4$) clock pulses related to the supply voltage frequency $w_0$ or one period of a triangular wave signal is outputted whenever the counter 18 counts 64 (16×4) clock pulses. Since the supply voltage frequency data $w_0$ are simultaneously inputted to both the counters 18 and 25 as the clock pulses, the pulse ratio (for generating one period) of the triangular wave to the sine wave is 2 (64) to 7 (224). However, the frequency data $w_0$ to be inputted to the counter 18 are switched by means of the switching unit 16 according to the magnitude of frequency $w_0$, and the ratio of the triangular wave to the sine wave changes according to the frequency $w_0$. For instance, when the contact $16_1$ is closed, the clock pulses inputted to the counter 25 is always divided into 1/48 ($\frac{1}{8} \times 1/6$), the ratio of pulses inputted to the counter 18 to the counter 25 is 1:1/48 or 48:1, so that the ratio of generated triangular wave signals to generated sine wave signals is 48/2:1/7, that is, 168:1. In other words, triangular wave signals of 168 (48×7/2) are outputted during each period of the sine wave signal. Similarly, when the contact $16_2$ is closed, triangular wave signals of 84 (24×7/2) are outputted; when the contact $16_3$ is closed, triangular wave signals of 42 (12×7/2) are outputted; when the contact $16_4$ is closed, triangular wave signals of 21 (6×7/2) are outputted, respectively. In summary, the number of the triangular wave signals generated during one period of the sine or cosine wave signal decreases with the increasing magnitude of the supply voltage angular frequency $w_0$.

In the function generator thus constructed, the supply voltage angular frequency $w_0$ is divided into a plurality of ranges (e.g. very low, low, medium and high), and since the number of triangular wave signals generated during one period of supply voltage signal is increased with decreasing magnitude of the frequency $w_0$, by increasing the frequency of the triangular (carrier) wave signal $T_{ri}$ freely, it is possible to improve the response characteristics of induction motor speed control and also reduce the higher harmonics (current).

As described above, in the decoupled vector control system for driving an induction motor according to the present invention, since the decoupling calculation unit 3 and the 2–3 phase transformation unit 7 are combined, it is possible simplify the system configuration.

Since the four-quadrant operation can be achieved by continuously changing the plus and minus signs of trigonometric signals according to the rotational direction of an induction motor, it is possible to smoothly switch the induction motor from the normal driving direction to the reverse driving direction or vice versa.

Further, since the frequency ratio of the triangular (carrier) wave signal to the trigonometric signals is adjusted according to the magnitude of the supply voltage frequency in synchronization with each other, it is possible to improve the response characteristics of the speed control particularly at a low speed range and to eliminate higher harmonic currents.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. An induction motor decoupled vector control system, which comprises:
   (a) speed sensing means for detecting a rotor angular frequency $w_r$ of an induction motor;
   (b) proportional integrating means for generating a primary reference current $i_{1\beta}^*$ corresponding to a secondary reference driving current on the basis of a difference between a reference rotor angular frequency $w_r^*$ and a detected rotor angular frequency $w_r$ in order to obtain a reference torque;
   (c) supply voltage angular frequency calculating means for calculating a primary supply voltage angular frequency $w_0$ on the basis of the primary reference current $i_{1\beta}^*$, a primary reference current $i_{1\alpha}^*$ corresponding to a secondary magnetic flux, a detected rotor angular frequency $w_r$, and a ratio $\tau_2$ of a secondary inductance $L_2$ to a secondary resistance $r_2$;
   (d) SIN/COS signal generating means for generating a sine wave signal with an angular frequency $w_0$ and a cosine wave signal with an angular frequency $w_0$, independently;
   (e) first calculating means for calculating fixed d-q coordinate primary voltages $e_{1d}$ and $e_{1q}$ on the basis of the primary reference currents $i_{1\alpha}$ and $i_{1\beta}$ and the sine and cosine wave signals in accordance with following expressions:

$$e_{1d} = (r_1 + L_1S) \cos w_0t \cdot i^*_{1\alpha} - (r_1 + L_\sigma S) \sin w_0t \cdot i^*_{1\beta}$$

$$e_{1q} = (r_1 + L_1S) \sin w_0t \cdot i^*_{1\alpha} + (r_1 + L_\sigma S) \cos w_0t \cdot i^*_{1\beta}$$

where $r_1$ denotes a primary resistance; $L_1$ denotes a primary inductance; $L_\sigma$ denotes an equivalent leakage inductance $(L_1L_2 - M^2)/L_2$ M: mutual inductance; S denotes a Laplace operator; and (f) power amplifying means for driving the induction motor on the basis of the calculated primary reference voltages $e_{1d}$, $e_{1q}$.

2. The induction motor decoupled vector control system as set forth in claim 1, which further comprises second calculating means for calculating three-phase primary reference voltages $e^*_a$, $e^*_b$, $e^*_c$ on the basis of the calculated 2-phase primary reference voltages $e_{1d}$, $e_{1q}$ in accordance with the following expressions:

$$e^*_a = e_{1d}$$

$$e^*_b = -\tfrac{1}{2}e_{1d} - \frac{\sqrt{3}}{2} e_{1q}$$

$$e^*_c = -\tfrac{1}{2}e_{1d} + \frac{\sqrt{3}}{2} e_{1q}$$

in order to drive a 3-phase induction motor.

3. The induction motor decoupled vector control system as set forth in claim 2, which further comprises triangular signal generating means for generating a triangular wave signal in synchronization with said SIN/COS wave signals and wherein said power amplifying means is PWM inverter means for generating three PWM (pulse width modulated) control signals in response to the calculated three-phase primary voltages $e^*_a$, $e^*_b$, $e^*_c$ and the generated triangular wave signals, in order to drive a 3-phase induction motor.

4. The induction motor decoupled vector control system as set forth in claim 1, wherein said first calculating means comprises:

(a) first proportional differentiating means for calculating a first product of the sine wave signal and $(r_1 + L_\sigma S)$;

(b) a second proportional differentiating means for calculating a second product of the cosine wave signal and $(r_1 + L_1S)$;

(c) a third proportional differentiating means for calculating a third product of the cosine wave signal and $(r_1 + L_\sigma S)$;

(d) a fourth proportional differentiating means for calculating a fourth product of the sine wave signal and $(r_1 + L_1S)$;

(e) a first multiplier for multiplying the first product $(r_1 + L_\sigma S) \sin w_0t$ by the primary reference current $i^*_{1\beta}$;

(f) a second multiplier for multiplying the second product $(r_1 + L_1S) \cos w_0t$ by the primary reference current $i^*_{1\alpha}$;

(g) a third multiplier for multiplying the third product $(r_1 + L_\sigma S) \cos w_0t$ by the primary reference current $i^*_{1\beta}$;

(h) a fourth multiplier for multiplying the fourth product $(r_1 + L_1S) \sin w_0t$ by the primary reference current $i^*_{1\alpha}$;

(i) a subtractor for subtracting the first multiplied result $(r_1 + L_\sigma S) \sin w_0t \cdot i^*_{1\beta}$ from the second multiplied result $(r_1 + L_1S) \cos w_0t \cdot i^*_{1\alpha}$ to obtain the fixed d-q coordinate voltage $e_{1d}$; and (j) a adder for adding the third multiplied result $(r_1 + L_\sigma S) \cos w_0t \cdot i^*_{1\beta}$ to the fourth multiplied result $(r_1 + L_1S) \sin w_0t \cdot i^*_{1\alpha}$ to obtain the fixed d-q coordinate voltage $e_{1q}$.

5. The induction motor decoupled vector control system as set forth in claim 2, wherein said second calculating means comprises:

(a) a first inversion amplifier with a gain of 1 responsive to the voltage $e_{1d}$ to generate a signal $(-\tfrac{1}{2}e_{1d})$;

(b) an amplifier with a gain of $$\frac{\sqrt{3}}{2}$$

responsive to the voltage $e_{1q}$ to generate a signal $$\left( \frac{\sqrt{3}}{2} e_{1q} \right);$$

(c) a second inversion amplifier with a gain of 1 responsive to the signal $$\left( \frac{\sqrt{3}}{2} e_{1q} \right)$$

to generate a signal $$\left( -\frac{\sqrt{3}}{2} e_{1q} \right);$$

(d) a first adder for adding the signal $(-\tfrac{1}{2}e_{1d})$ and the signal $$\left( -\frac{\sqrt{3}}{2} e_{1q} \right)$$

to generate the reference voltage $e^*_b$; and (e) a second adder for adding the signal $(-\tfrac{1}{2}e_{1d})$ and the signal $$\left( \frac{\sqrt{3}}{2} e_{1q} \right)$$

to generate the reference voltage $e^*_c$.

6. The induction motor decoupling vector control system as set forth in claim 4, wherein said first calculating means further comprises:

(a) a first integrator with a first-order delay responsive to the signal $\sin w_0t$; and (b) a second integrator with a first-order delay responsive to the signal $\cos w_0t$, the time constant of said first and second integrators being sufficiently smaller as compared with the supply voltage angular frequency $w_0$ in order to eliminate high frequency components superimposed upon the sine or cosine signal.

7. The induction motor decoupled vector control system as set forth in claim 1, wherein said SIN/COS signal generating means comprises:

(a) a rotational direction detector for detecting a rotational direction of the motor and outputting an up or down signal corresponding thereto;

(b) a first up-down counter for counting up or down clock pulses synchronized with a supply voltage signal of an angular frequency $w_0$ in response to the up or down signal outputted from said rotational direction detector;

(c) a first read-only memory for outputting sample data indicative of a cosine wave sequentially in response to count signals outputted from said first counter;

(d) a second read-only memory for outputting sample data indicative of a sine wave sequentially in response to count signals outputted from said first counter;

(e) a first digital-analog converter for converting the digital sample date outputted from said first read-only memory into analog values indicative of a cosine wave signal; and (f) a second digital-analog converter for converting the digital sample data outputted from said second read-only memory into analog values indicative of a sine wave signal.

8. The induction motor decoupled vector control system as set forth in claim 3, wherein said triangular signal generating means comprises:

(a) an absolute value detecting unit for generating a signal, the voltage level of which is proportional to the magnitude of supply voltage angular frequency $w_0$ irrespective of the plus or minus sign thereof;

(b) a voltage-frequency converter for converting the output of said absolute value detection unit into a signal with a frequency proportional to the output voltage level of said absolute value detection unit;

(c) a plurality of series-connected dividers for dividing the frequency of the signal outputted from said voltage-frequency converter;

(d) a switching signal generator for outputting a plurality of switching signals according to the magnitude of supply voltage angular frequency $w_0$;

(e) a switching unit selectively connected to said series-connected dividers for selectively outputting the signal outputted from said voltage-frequency converter in such a way that less-times divided converter signals are outputted when the supply voltage frequency is low and many-times divided converter signals are outputted when the supply voltage frequency is high;

(f) a second up-down counter for counting the converter signals up or down repeatedly in response to carry signals generated therefrom; and (g) a third digital-analog converter for converting the counted digital value into analog values corresponding thereto.

9. A method of vector-controlling an induction motor, which comprises the following steps of:

(a) detecting a rotor angular frequency $w_r$ of an induction motor;

(b) determining a primary reference current $i^*_{1\beta}$ corresponding to a secondary reference driving current on the basis of a difference between a reference rotor angular frequency $w_r^*$ and a detected rotor angular frequency $w_r$ in order to generate a reference torque;

(c) calculating a primary supply voltage angular frequency $w_0$ on the basis of the determined primary reference current $i^*_{1\beta}$, a constant primary reference current $i^*_{1\alpha}$ corresponding to a secondary magnetic flux, a detected rotor angular frequency $w_r$ and a ratio $\tau_2$ of a secondary inductance $L_2$ to a secondary resistance $r_2$;

(d) generating a sine wave signal with an angular frequency $w_0$ and a cosine wave signal with an angular frequency $w_0$, independently;

(e) calculating fixed d-q coordinate primary voltages $e_{1d}$ and $e_{1q}$ on the basis of the primary reference currents $i^*_{1\alpha}$ and $i^*_{1\beta}$ and the sine and cosine wave signals in accordance with following expressions:

$e_{1d} = (r_1 + L_1 S) \cos w_0 t \cdot i^*_{1\alpha} - (r_1 + L_\sigma S) \sin w_0 t \cdot i^*_{1\beta}$ $e_{1q} = (r_1 + L_1 S) \sin w_0 t \cdot i^*_{1\alpha} + (r_1 + L_\sigma S) \cos w_0 t \cdot i^*_{1\beta}$ where $r_1$ denotes a primary resistance; $L_1$ denotes a primary inductance; $L_\sigma$ denotes an equivalent total leakage inductance $(L_1 L_2 - M^2)/L_2$ M: mutual inductance; S denotes a Laplace operator; and (f) driving an induction motor on the basis of the calculated primary reference voltages $e_{1d}$, $e_{1q}$.

10. The method of vector-controlling an induction motor as set forth in claim 9, which further comprises the step of calculating primary reference three-phase voltages $e^*_a$, $e^*_b$, $e^*_c$ on the basis of the calculated primary reference 2-phase primary voltages $e_{1d}$, $e_{1q}$ in accordance with the following expressions:

$$e^*_a = e_{1d}$$

$$e^*_b = -\tfrac{1}{2} e_{1d} - \frac{\sqrt{3}}{2} e_{1q}$$

$$e^*_c = -\tfrac{1}{2} e_{1d} + \frac{\sqrt{3}}{2} e_{1q}$$

in order to drive a 3-phase induction motor.

11. The method of vector-controlling an induction motor as set forth in claim 10, which further comprises the step of:

(a) generating a triangular wave signal with an angular frequency $w_0$ in synchronization with said SIN/COS wave signals; and (b) generating three PWM (pulse width modulated) control signals in response to the calculated three-phase primary voltages $e^*_a$, $e^*_b$, $e^*_c$ and the generated triangular wave signals, in order to drive a 3-phase induction motor.

12. The method of vector-controlling an induction motor as set forth in claim 9, wherein said step of calculating fixed d-q coordinate primary voltages $e_{1d}$, $e_{1q}$ comprises the following steps of:

(a) calculating a first product of the sine wave signal and $(r_1 + L_\sigma S)$;

(b) calculating a second product of the cosine wave signal and $(r_1 + L_1 S)$;

(c) calculating a third product of the cosine wave signal and $(r_1 + L_\sigma S)$;

(d) calculating a fourth product of the sine wave signal and $(r_1 + L_1 S)$;

(e) multiplying the first product $(r_1 + L_\sigma S) \sin w_0 t$ by the primary reference current $i^*_{1\beta}$;

(f) multiplying the second product $(r_1 + L_1 S) \cos w_0 t$ by the primary reference current $i^*_{1\alpha}$;

(g) multiplying the third product $(r_1 + L_\sigma S) \cos w_0 t$ by the primary reference current $i^*_{1\beta}$;

(h) multiplying the fourth product $(r_1+L_1 S)\sin w_0 t$ by the primary reference current $i_{1a}$;

(i) subtracting the first multiplied result $(r_1+L_\sigma S)\sin w_0 t \cdot i_{1\beta}$ from the second multiplied result $(r_1+L_1 S)\cos w_0 t \cdot i_{1\alpha}$ to obtain the fixed d-q coordinate voltage $e_{1d}$; and (j) adding the third multiplied result $(r_1+L_\sigma S)\cos w_0 t \cdot i_{1\beta}^*$ to the fourth multiplied result $(r_1+L_1 S)\sin w_0 t \cdot i_{1\alpha}^*$ to obtain the fixed d-q coordinate voltage $e_{1q}$.

13. The method of vector-controlling an induction motor as set forth in claim 10, wherein said step of calculating three-phase primary reference voltages $e_a^*$, $e_b^*$, $e_c^*$ comprises the following steps of:

(a) calculating $(-\frac{1}{2}e_d)$ on the basis of the primary voltage $e_{1d}$;

(b) calculating $$\left(\frac{\sqrt{3}}{2} e_{1q}\right)$$

on the basis of the primary voltage $e_{1d}$;

(c) obtaining $$\left(-\frac{\sqrt{3}}{2} e_{1q}\right)$$

on the basis of the calculated value $$\left(\frac{\sqrt{3}}{2} e_{1q}\right);$$

(d) adding the calculated value $(-\frac{1}{2}e_d)$ to the calculated value $$\left(-\frac{\sqrt{3}}{2} e_{1q}\right)$$

to obtain the reference voltage $e_b^*$; and (e) adding the calculated value $(-\frac{1}{2}e_d)$ to the calculated value $$\left(\frac{\sqrt{3}}{2} e_{1q}\right)$$

to obtain the reference voltage $e_c^*$.

14. The method of vector-controlling an induction motor as set forth in claim 12, wherein said step of calculating fixed d-q coordinate primary voltage $e_{1d}$, $e_{1q}$ further comprises the following steps of:

(a) integrating the signal $\sin w_0 t$ with a first-order delay; and (b) integrating the signal $\cos w_0 t$ with a first-order delay, the delay time being sufficiently smaller as compared with the supply voltage angular frequency $w_0$ in order to eliminate high frequency components superimposed upon the sine or cosine signal.

15. The method of vector-controlling an induction motor as set forth in claim 9, wherein said step of generating a sine wave signal and a cosine wave signal comprises the following steps of:

(a) detecting a rotational direction of the motor and outputting an up or down signal corresponding thereto;

(b) counting up or down clock pulses synchronized with a supply voltage signal of an angular frequency $w_0$ in response to the up or down signal;

(c) outputting sample data indicative of a cosine wave sequentially in response to the count signals;

(d) outputting sample data indicative of a sine wave sequentially in response to the count signals;

(e) converting the digital sample data into analog values indicative of a cosine wave signal; and (f) converting the digital sample data into analog values indicative of a sine wave signal.

16. The method of vector-controlling an induction motor as set forth in claim 11, wherein said step of generating the triangular signal comprises the following steps of:

(a) generating a signal the voltage level of which is proportional to the magnitude of supply voltage angular frequency $w_0$ irrespective of the plus or minus sign thereof indicative of rotational direction;

(b) voltage-frequency converting the generated signal into a signal with a frequency proportional to the voltage level of the generated signal;

(c) sequentially dividing the frequency of the signal;

(d) outputting a plurality of switching signals according to the magnitude of supply voltage angular frequency $w_0$;

(e) selectively outputting the V-F converted signal in such a way that less-times divided signals are outputted when the supply voltage frequency is low and many-times-divided signals are outputted when the supply voltage frequency is high;

(f) counting the V-F converted signals up or down repeatedly in response to carry signals generated therefrom; and (g) converting the magnitude of the digitally counted value into analog values corresponding thereto.

* * * * *